(12) United States Patent
Snyder

(10) Patent No.: US 7,291,194 B2
(45) Date of Patent: Nov. 6, 2007

(54) INTERMITTENT MIXER WITH LOW PRESSURE DROP

(75) Inventor: Robert E. Snyder, Green, OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 53 days.

(21) Appl. No.: 11/196,084

(22) Filed: Aug. 3, 2005

(65) Prior Publication Data

US 2005/0274413 A1    Dec. 15, 2005

Related U.S. Application Data

(62) Division of application No. 10/391,393, filed on Mar. 18, 2003, now Pat. No. 6,946,011.

(51) Int. Cl.
*B01F 5/00* (2006.01)

(52) U.S. Cl. .................. 55/418; 55/419; 55/361; 95/273; 95/288; 137/111; 137/114; 137/896; 137/897; 137/898; 137/867; 138/37; 138/39; 138/42; 138/43; 48/180.1; 366/144; 366/150.1; 366/332; 366/336; 366/337; 366/338; 366/DIG. 3

(58) Field of Classification Search ............ 55/418, 55/419, 361; 95/273, 288; 137/111, 114, 137/896, 897, 898, 867; 138/37–39, 42, 138/43; 48/180.1; 366/144, 150.1, 332, 366/336–338, DIG. 3
See application file for complete search history.

(56) References Cited

U.S. PATENT DOCUMENTS

| | | | | |
|---|---|---|---|---|
| 2,142,665 A | * | 1/1939 | Brett et al. ................. | 137/896 |
| 3,545,470 A | * | 12/1970 | Paton ........................ | 137/111 |
| 4,469,446 A | * | 9/1984 | Goodboy .................... | 366/342 |
| 4,487,510 A | * | 12/1984 | Buurman et al. ........... | 366/337 |
| 4,498,786 A | * | 2/1985 | Ruscheweyh ............... | 366/336 |
| 6,299,657 B1 | * | 10/2001 | Schubert et al. ....... | 48/197 FM |
| 6,623,155 B1 | * | 9/2003 | Baron ..................... | 366/181.5 |
| 6,946,011 B2 | * | 9/2005 | Snyder ....................... | 55/418 |
| 2002/0079374 A1 | * | 6/2002 | DeSellem .................... | 236/16 |

* cited by examiner

*Primary Examiner*—Duane Smith
*Assistant Examiner*—Minh-Chau T. Pham
(74) *Attorney, Agent, or Firm*—Michael J. Seymour; Eric Marich

(57) ABSTRACT

A thermal mixer reduces the temperature of flue gas supplied to a fabric filter. Two spray dry absorbers are operable to cool flue gas. A housing of the mixer has first and second inlet passages for gas from the absorbers, an outlet passage for gas to the fabric filter, and a mixing passage. A set of damper vanes extends in the mixing passage and has a mixing position for mixing the flue gases from the inlet passages to supply mixed gas to the outlet passage at relatively high pressure drop but lower temperature if one of the absorbers in not operating. They have a non-mixing position for passage of gases without mixing and at low pressure drop when both absorbers are operating. The invention can also be used to improve mixing of combined gas streams initially having different chemical compositions or amounts of particle loading.

14 Claims, 5 Drawing Sheets

INTERMITTENT MIXER WITH LOW PRESSURE DROP

This application is a Divisional Application of U.S. application Ser. No. 10/391,393 filed on Mar. 18, 2003, now U.S. Pat. No. 6,946,011 B2.

FIELD AND BACKGROUND OF INVENTION

The present invention relates, in general, to intermittent mixing of two or more gas streams, and, in particular, to a new and useful apparatus for mixing relatively hot and cold flue gases with each other before they are supplied to a fabric filter during periods when the hot gas would be above the safe operating temperature of the fabric filter.

Dry scrubbing is the principal alternative to wet scrubbing for removing SO2 from flue gas released by utility boilers. Dry scrubbing is sometimes referred to as spray absorption, spray drying or semi-wet scrubbing. It involves spraying a highly atomized slurry or aqueous solution of an alkaline reagent into the hot flue gas, thereby absorbing SO2 and adiabatically cooling the flue gas. Unlike a wet scrubber installation, a dry scrubber, or spray dryer absorber, is positioned before a dust collector, such as an electrostatic precipitator or fabric filter. A fabric filter, or baghouse, collects dry particulate matter as the cooled flue gas passes through the filter material.

The publication *STEAM/its generation and use* 40$^{th}$ Ed, by Babcock & Wilcox, discloses at pages 32-9, 33-7 to 33-93 and 35-11 to 35-15, various particulars concerning fabric filters and dry scrubbers, which is incorporated herein as though fully set forth.

Application of a spray dryer absorber is limited to a flue gas volume from about 200 MWe plants on average. Larger plants require the use of several modules to treat the total flue gas flow. Baghouses fed by two or more SDAs (Spray Dry Absorbers) can be exposed to gases at temperatures that exceed the maximum allowable temperature for the bag material during periods where one SDA is taken off-line for maintenance.

Spray absorbers must be shut down periodically (e.g. bi-monthly) for maintenance on their atomizers which must be removed, or at least worked on. A spray absorber may also malfunction. During such upset periods the flue gas passing the out-of-service SDA will not be cooled sufficiently to pass to the following fabric filter structures for particle removal, since the high temperature of the gas would damage the fabric.

Such upset periods should not cause a shut down of the entire boiler or furnace or other drastic measures. The present invention seeks to solve this problem.

In order to minimize the amount of high-temperature gas entering the baghouse, the present invention proposes an adjustable thermal mixing, damper-vane apparatus and method.

During normal operation, where both flue gas streams are the same, mixing dampers in the apparatus are fully open, and do not change the direction of the flow. During an outage of one SDA, where that flue-gas temperature is much higher than normal, the dampers are moved to a configuration that promotes mixing of the two gas streams.

In the prior art, thermal protection of fabric filters has been by use of water spray, air induction or by use of a bypass flue.

U.S. patent application 2002/0079374 to DeSellem, published Jun. 27, 2002, discloses a boiler internal flue gas by-pass damper for flue gas temperature control which permits adjustment of the heat transfer effectiveness of a final bank of heat exchanger surface to control a temperature of the flue gas flowing through and exiting from the flue gas passage and conveyed to a downstream device having a minimum operating temperature.

The use of a bypass mode during startup to prevent thermal damage to fabric filters is disclosed in U.S. Pat. No. 4,322,224 to Roth. U.S. Pat. No. 4,523,931 to Miller et al. also teaches a bypass mode for gases. U.S. Pat. No. 4,372,926 to Gude et al. discloses the mixing of gases for heating the mixed gas for supply to a baghouse. U.S. Pat. No. 5,953,898 to Dryden discloses a dedicated heat exchanger upstream of a ceramic filter for controlling temperature. See U.S. Pat. No. 4,452,765 to Peterson et al., U.S. Pat. No. 5,599,508 to Martinelli and U.S. Pat. No. 5,651,948 to Myers et al. for other flue gas treatment schemes and U.S. Pat. No. 6,257,155 to Greene for a curved blade bypass structure for flue gases.

Another more common approach to provide thermal protection of fabric filters is to use bags of higher temperature rating. These bags, however, are more expensive and may not work as well. Therefore a method and apparatus that allows the use of less-expensive, lower temperature bags, while minimizing pressure drop, would be welcomed by industry.

SUMMARY OF INVENTION

It is an object of the present invention to provide an apparatus in the form of a mixer which reduces the temperature of flue gas supplied to a fabric filter. Two or more spray dry absorbers are operable to cool flue gas. A housing of the mixer has first and second inlet passages for gas from the absorbers, an outlet passage for gas to the fabric filter, and a mixing passage. A set of damper vanes extends in the mixing passage and has a mixing position for mixing the flue gases from the inlet passages to supply mixed gas to the outlet passage at relatively high pressure drop but lower temperature if one of the absorbers in not operating. They have a non-mixing position for passage of gases without mixing, and at low pressure drop, when both absorbers are operating.

It is a further object of the invention to provide a method for reducing the temperature of flue gas supplied to a fabric filter from two spray dry absorbers when one of the absorbers is not operating to cool the gas passing therein.

It is a still further object of the invention to provide a method for mixing two gas streams to make the gas composition of the combined stream more uniform.

It is another object of the invention to provide a method of mixing a particle-laden gas stream with another gas stream to obtain a combined stream having a more uniform cross-sectional particle loading.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
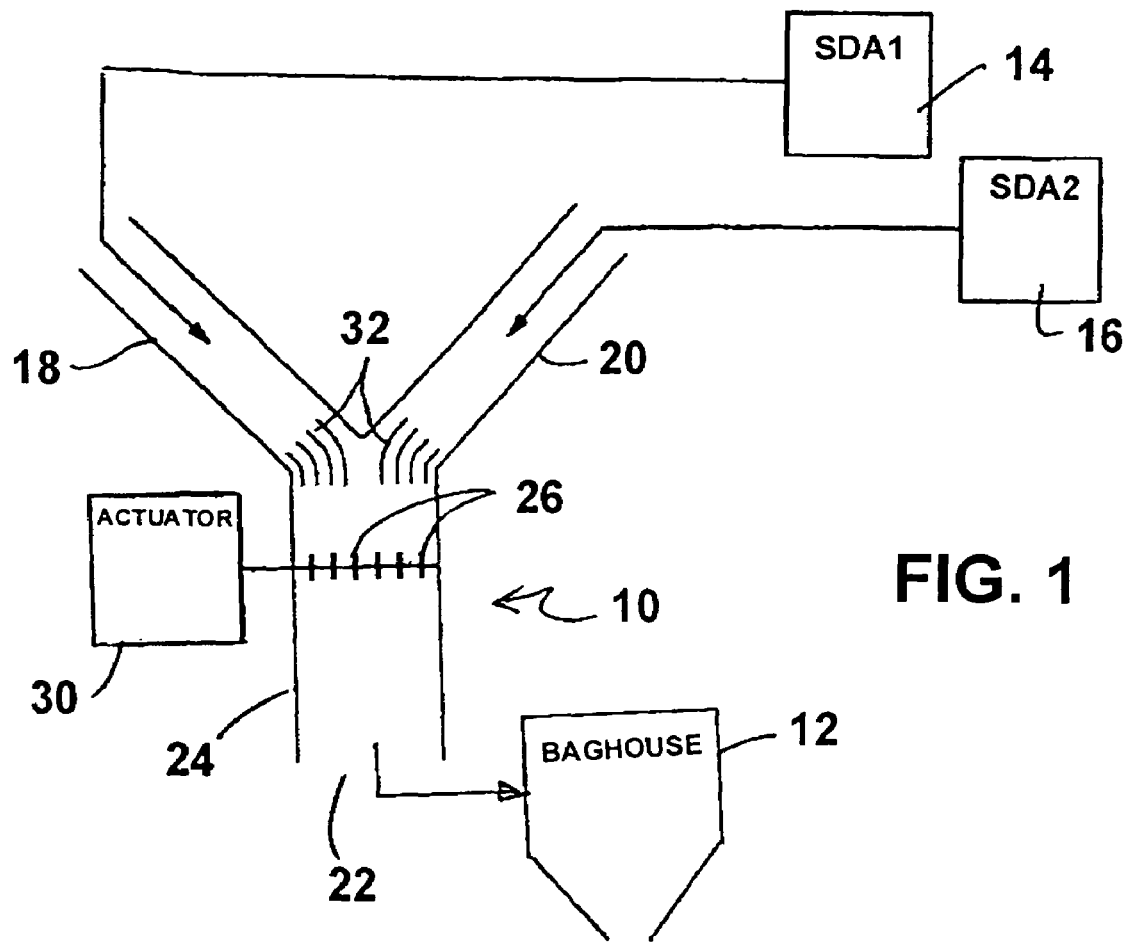
FIG. 1 is a schematic top plan view of a mixer according to the present invention in a non-mixing, low pressure-drop configuration.

Referring now to the drawings, in which like reference numerals are used to refer to the same or similar elements, the invention is a mixer 10 in FIG. 1, for mixing two gas streams, e.g. for reducing overall temperature of flue gas supplied to a fabric filter such as a baghouse 12. Such filters containing fabric having a maximum temperature tolerance, e.g. about 250 degrees F. for lower-cost bags.

The flue gases come from at least two spray dry absorbers 14 and 16 which are each operable to cool flue gas passing therein in a known manner.

Mixer 10 comprises a housing having a first inlet passage 18 for flue gas from the first spray dry absorber 14, a second inlet passage 20 for flue gas from the second spray dry absorber 16, an outlet passage 22 for supplying flue gases from the first and second spray dry absorbers to the fabric filter or baghouse 12, and a mixing passage 24 between the inlet passages 18, 20 and the outlet passage 22.

A plurality of damper vanes 26 extend at least partly across the mixing passage and having a mixing position shown in FIGS. 2 and 4-6, for mixing together the flue gases from the first and second inlet passages 18, 20 to supply mixed gas to the outlet passage 22 at relatively high pressure drop in the mixing passage. The vanes 26 also have a non-mixing position shown in FIGS. 1 and 3, for passage of the flue gases from the first and second inlet passages 18, 20 without mixing to supply unmixed gas to the outlet passage 22 at relatively low pressure drop.

At least one actuator 30 is connected to the vanes 26 for moving the vanes 26 to the mixing position when one of the spray dry absorbers is not operating to cool flue gas passing therein so that the temperature of the mixed flue gas is intermediate the temperature of flue gas that has been cooled and the flue gas that has not been cooled. Actuator 30 also moves the vanes 26 to the non-mixing position when the first and second inlet passages 18, 20 both receive cooled flue gas.

As evident in all of the figures, the mixing passage has a longitudinal axis and each of the inlet passages 18 and 20 extends at an acute angle, e.g. 10 to 90 degrees, but preferable 45 degrees, to the longitudinal axis of the mixing passage.

Figure 3:
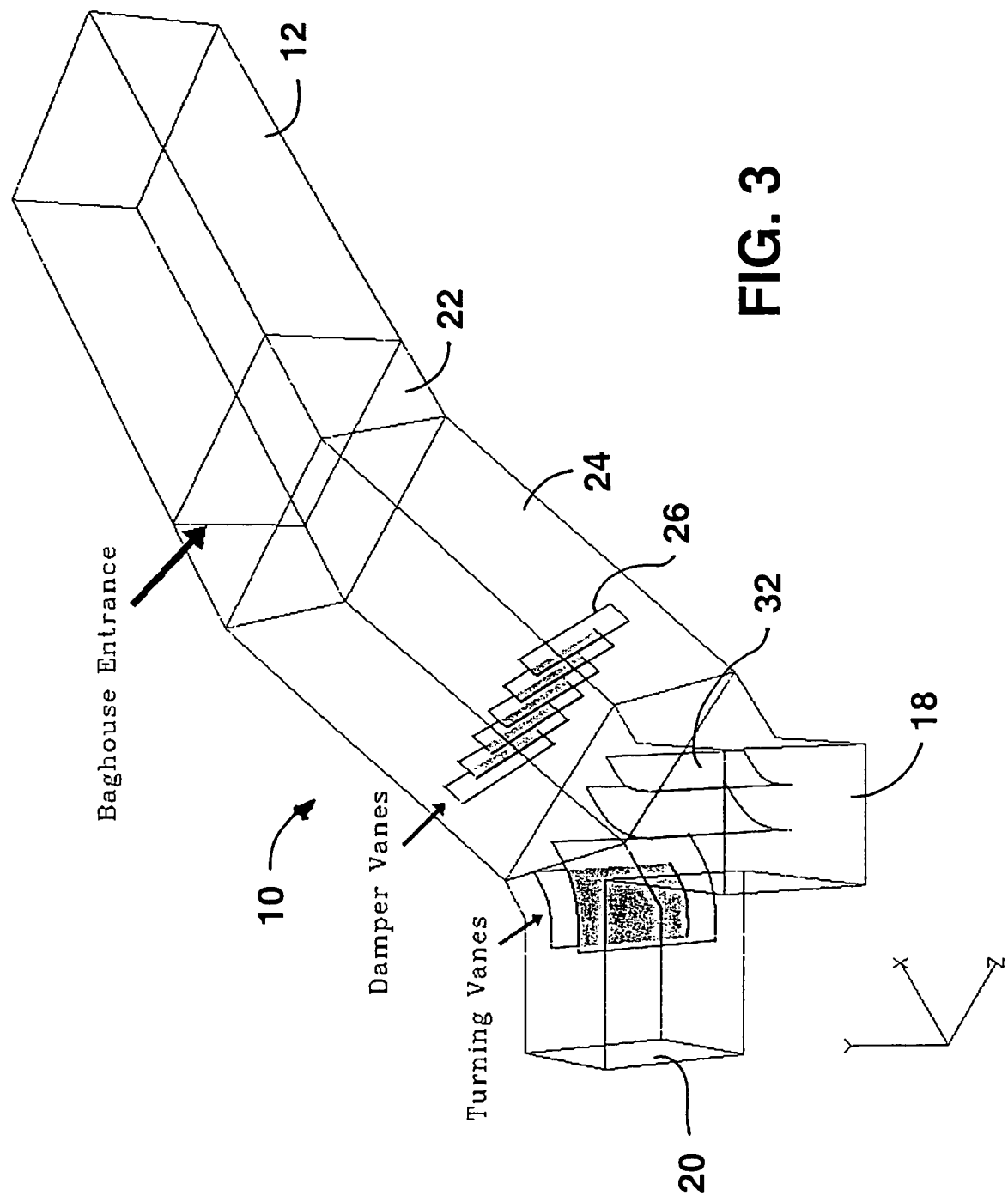
FIG. 3 is a schematic, perspective view of one embodiment of the invention in a non-mixing configuration.

The axis of the mixing passage 24 can be inclined vertically between the inlet passages 18, 20 and the outlet passage 22 as shown in FIG. 3 for example. One or more curved diverting vanes 32 may also be provided in each of the inlet passages 18, 20 for diverting flue gas toward the vanes 26, and to minimize pressure drop.

The vanes 26, in the non-mixing position, are parallel to, and spaced from each other, each vane lying in a plane that is parallel to the axis of the mixing passage in the non-mixing position as shown in FIG. 3, for example. Vanes 26 extend from a bottom to a top of the mixing passage in preferred embodiments of the invention, and the vanes are spaced from each other horizontally across the mixing passage.

The vanes 26 in the mixing position are at an acute angle to the axis of the mixing passage as shown in FIGS. 2, 4, 5 and 6. The vanes 26 in the mixing position are provided in at least two vertically spaced levels in the embodiments of FIGS. 5 and 6, the vanes in one level being at a different acute angle than the vanes in the other level. The vanes 26 are in two levels, 126 and 226, in FIG. 5 and four levels, 126, 226, 326, and 426, in FIG. 6.

Figure 2:
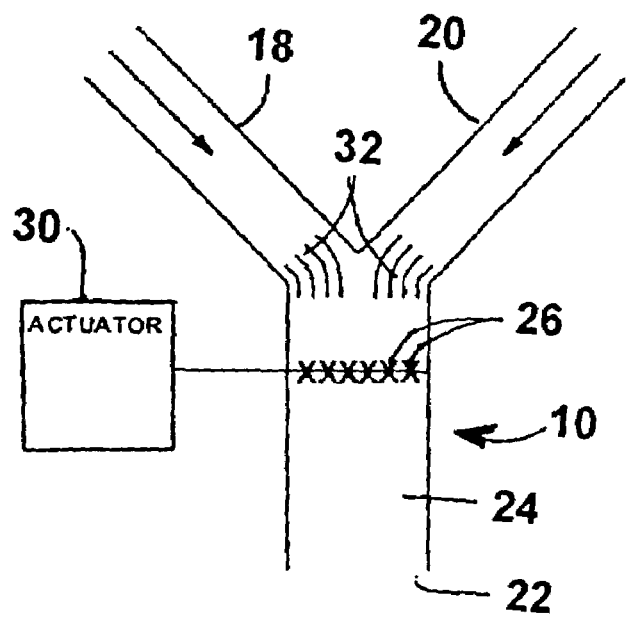
FIG. 2 is a view similar to FIG. 1 of the mixer in a mixing, high pressure-drop configuration.

In FIG. 2 the vanes 26 in the mixing position are bifurcated into at least two sections which are at different acute angles so that pairs of vanes form an X-shape in vertical plan view.

Actuators of known design can be used to effect the mixing position. For example each vane or vane section can be mounted on a vertical shaft with a servo motor or linkage to each shaft for rotating the shaft.

Figure 4:
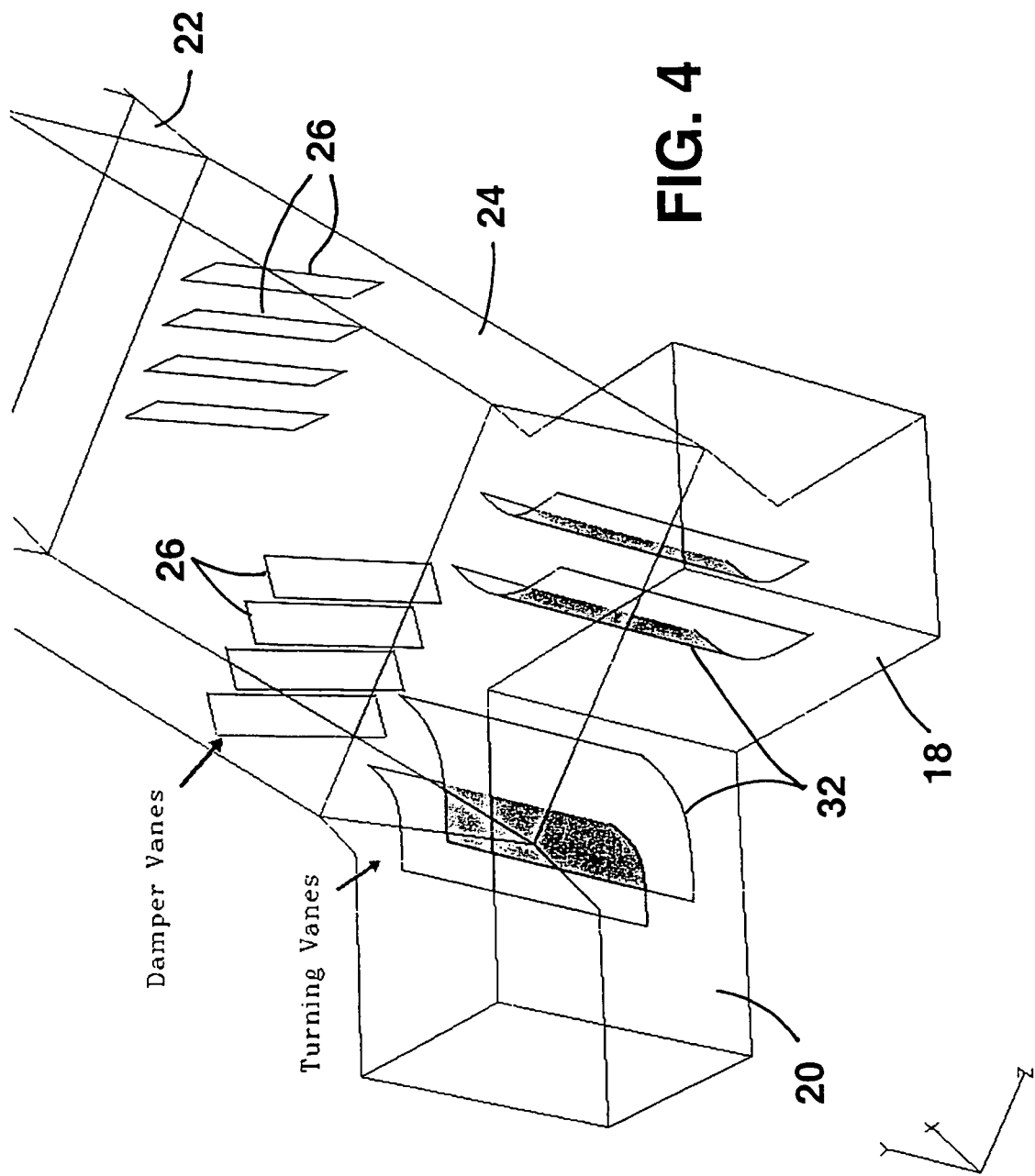
FIG. 4 is an enlarged perspective view of another embodiment of the invention in a mixing configuration.

In FIG. 4, the vanes 26 are provided in at least two sets that are spaced from each other along the axis of the mixing passage. This embodiment of the invention, however, was not as successful as the other embodiments when tested according to numerical modeling performed to prove the effectiveness of the invention.

Computational fluid dynamics models based on the SDA-to-baghouse fluework proposed for a new operating unit, Tucson Electric's Springerville Unit #3, were developed to evaluate the effectiveness of the invention. Each model consisted of one SDA stream at 160 degrees F. and the other at 270 degrees F., with flue-gas flow rate (~6.23 Mlb/hr) and properties taken from data at the KCP&L Hawthorne Station. The baghouse pressure drop was assumed to be 6 in H2O and was approximated in the model with a loss factor (though the actual baghouse configuration was not represented). In order to determine if a mixing device as described above is feasible, ten different damper vane mixing configurations were examined. FIGS. 3-6 are representative.

For each mixing device considered, the mixing of the flow and the thermal profiles were examined. At the baghouse entrance, important parameters were: the maximum flue-gas temperature, the standard deviation from the average (which was roughly 215 degrees F. for all cases), and the percentage of the flow that was entering the baghouse above 250 degrees F. (the maximum allowable temperature for the lower-cost bags).

Flue gas streamlines colored by gas temperature, as well as the gas temperature contours at the baghouse entrance plane showed the effectiveness of each embodiment. One such portrayal (not shown) clearly demonstrated that with the damper vanes fully open (the non-mixing position—which is essentially equivalent to no damper vanes), the cold and hot flows are stratified, with very little mixing. The maximum temperature at the baghouse entrance plane was 267 degrees F. The standard deviation of the temperature distribution is 43 degrees F., and a large percentage of the flow (35%) entering the baghouse is at a temperature greater than 250 degrees F.

Another temperature contour map of the embodiment of FIG. 4, showed this two-stage damper vane configuration was not very effective. The flow was pushed from side to side but did not mix well. The maximum temperature at the baghouse entrance plane was 263 degrees F. The standard deviation of the temperature distribution was 40 degrees F., and more than 27% of the flow entered the baghouse at a temperature greater than 250 degrees F. The pressure loss over this configuration was 1.8 in H2O greater than the pressure loss over the fully-opened configuration.

Figure 5:
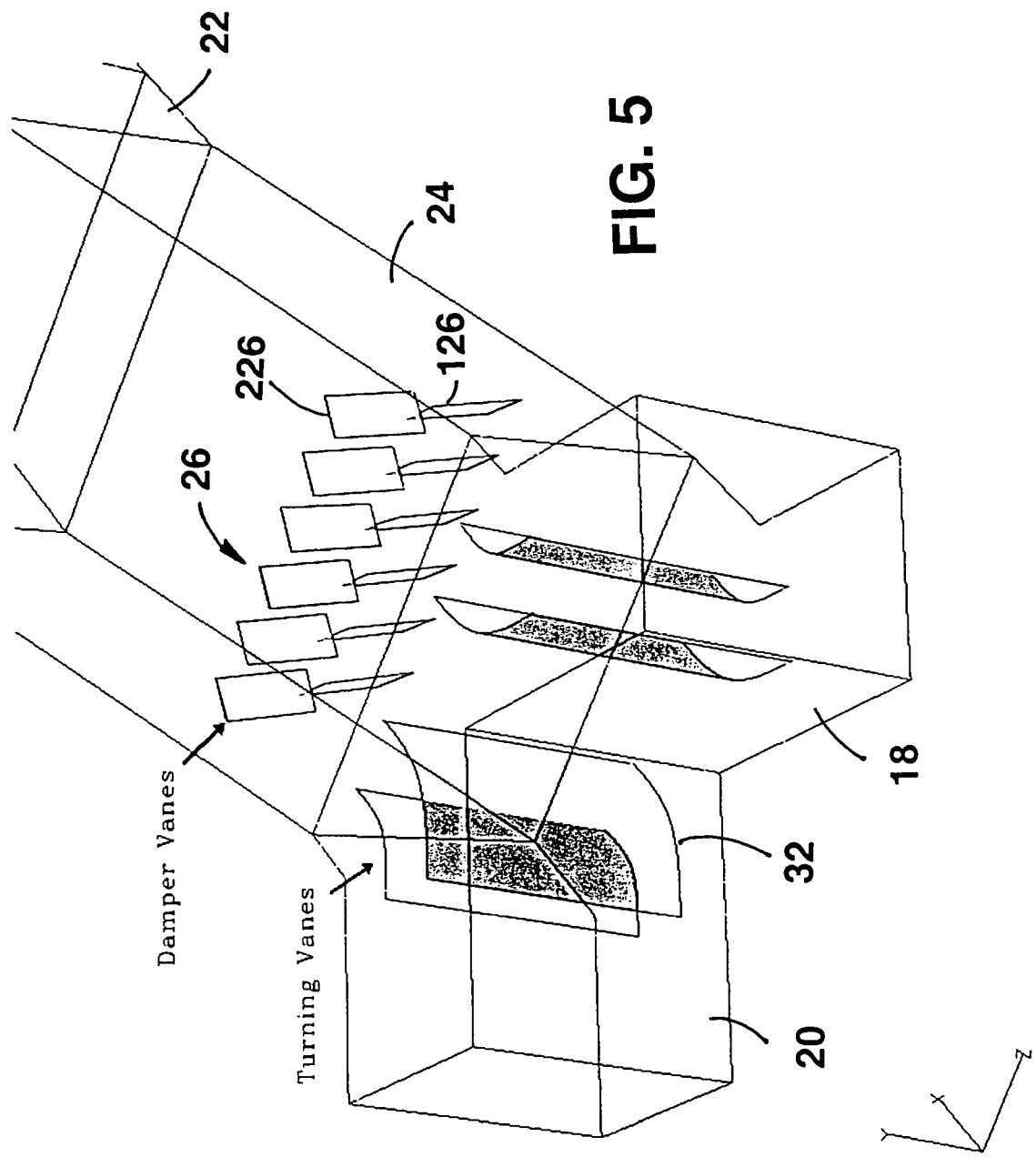
FIG. 5 is an enlarged perspective view of a variant to the embodiment of FIG. 2 in a mixing configuration.

FIG. 5, the single-stage damper vane configuration with two levels, was much more effective. Each vane is split to allow the top portion 226 to be angled in one direction (45 degrees from fully opened), with the bottom portion 126 angled 90 degrees from the top portion 226. When the top layer of gas gets directed to the right (looking from above), this creates a lower-pressure region that allows the bottom layer of gas to move upward after it has been directed to the left. In the same manner, the top layer of gas can move downward after its movement to the right side. This type of configuration produces a swirling motion of the flue gas, thus providing substantially more thorough mixing. The maximum temperature at the baghouse entrance plane is 261 degrees F., which is a slight improvement from the previous configurations. The standard deviation of temperature at the baghouse entrance is only 18 degrees F., which implies a more uniform temperature distribution at that plane. Only 5% of the flow is entering the baghouse at a temperature greater than 250 degrees F., which is a substantial improvement from the previous configurations. In addition, the pressure loss has been reduced to 0.65 in H2O greater than the pressure loss over the fully-opened configuration.

Figure 6:
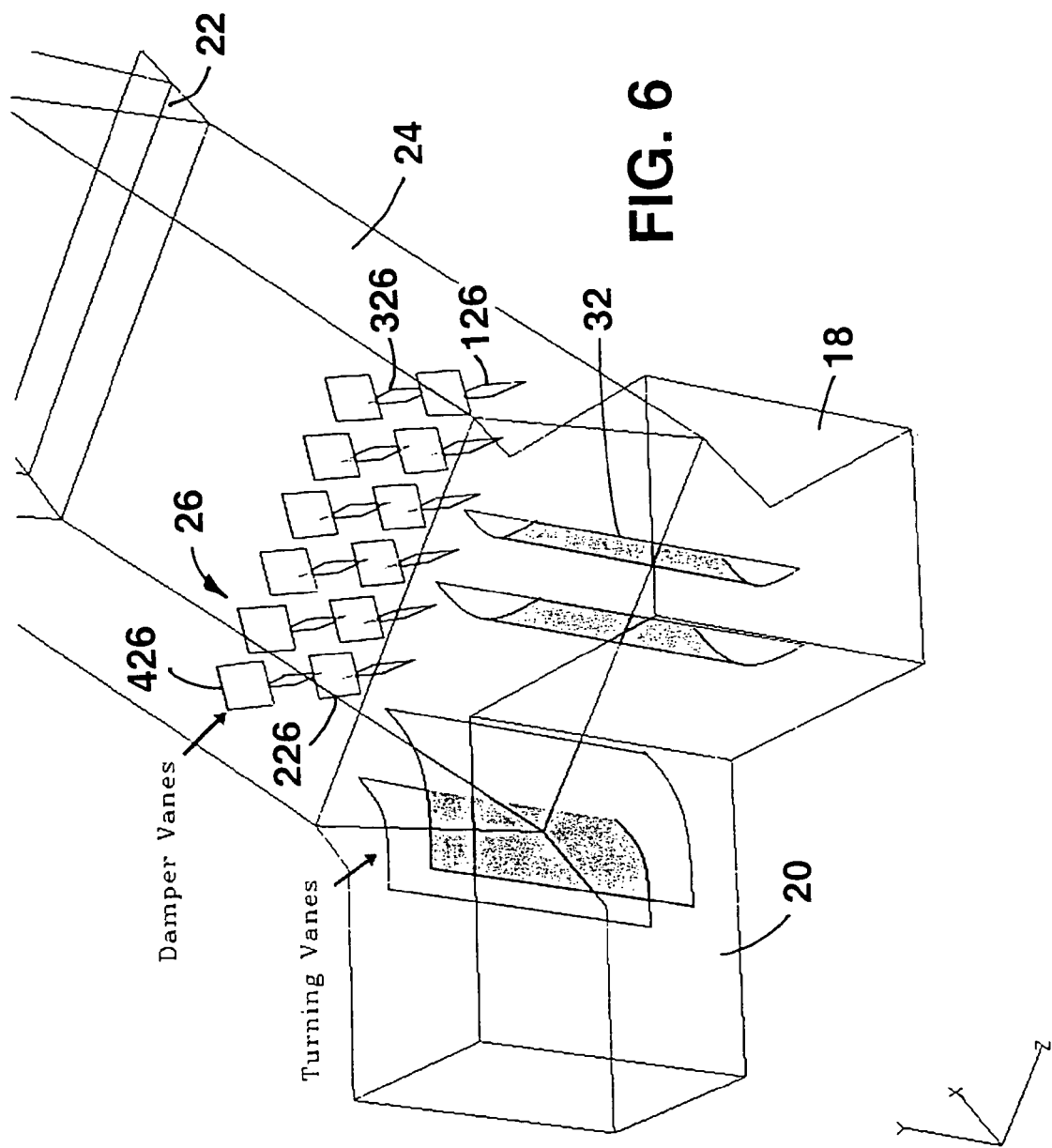
FIG. 6 is an enlarged perspective view of another variant to the embodiment of FIG. 2, also in a mixing configuration.

FIG. 6, the single-stage, four-level perpendicular damper vane configuration, also provides very good mixing. The maximum temperature at the baghouse entrance plane has been reduced to 256 degrees F. The standard deviation of temperature at the baghouse entrance is 19 degrees F., approximately the same as the previous case. The percentage of flow entering the baghouse at a temperature greater than 250 degrees F. is 6%, which also is approximately the same as the previous case. The pressure loss is 0.69 in H2O greater than the pressure loss over the fully-opened configuration.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles. For example in addition to the providing thermal mixing of gas streams at different temperatures, the invention can also be used to provide improved mixing of gas streams having different chemical compositions or particle loading. While these are important attributes in many mixing applications, they are especially important in operation with one scrubber out of service to maximize the possibility of additional SO2 removal in the baghouse.

I claim:

1. A thermal mixer for reducing overall temperature of flue gas supplied to a fabric filter containing fabric having a maximum temperature tolerance, the flue gas supplied from at least two spray dry absorbers which are each operable to cool flue gas passing therein, the mixer comprising:

a housing having a first inlet passage for flue gas from a first spray dry absorber, a second inlet passage for flue gas from a second spray dry absorber, an outlet passage for supplying flue gases from the first and second spray dry absorbers to a fabric filter, and a mixing passage between the inlet passages and the outlet passage, the mixing passage having an axis;

a plurality of damper vanes extending at least partly across the mixing passage and having a mixing position for mixing together the flue gases from the first and second inlet passages to supply mixed gas to the outlet passage at relatively high pressure drop in the mixing passage, the vanes having a non-mixing position for passage of the flue gases from the first and second inlet passages without mixing to supply unmixed gas to the outlet passage at relatively low pressure drop, the vanes in the non-mixing position being parallel to, and spaced from each other, with each vane lying in a plane that is parallel to the axis of the mixing passage in the non-mixing position;

each vane extending from a bottom to a top of the mixing passage and the vanes being spaced from each other horizontally across the mixing passage; and actuator means connected to the vanes for moving the vanes to the mixing position when one of the spray dry absorbers is not operating to cool the flue gas passing therein so that the temperature of the mixed flue gas is intermediate the temperature of flue gas that has been cooled and the flue gas that has not been cooled, the actuator means moving the vanes to the non-mixing position when the first and second mixing inlet passages both receive cooled flue gas.

2. A thermal mixer according to claim 1, wherein each of the inlet passages extends at an acute angle to the axis of the mixing passage.

3. A thermal mixer according to claim 1, wherein the axis of the mixing passage is inclined vertically between the inlet passages and the outlet passage.

4. A thermal mixer according to claim 1, including at least one curved diverting vane in each of the inlet passages for diverting flue gas toward the vanes.

5. A thermal mixer according to claim 1, wherein the vanes in the mixing position are at an acute angle to the axis of the mixing passage.

6. A thermal mixer according to claim 1, wherein the vanes in the mixing position are provided in at least two levels, the vanes in one level being at a different acute angle than the vanes in the other level.

7. A thermal mixer according to claim 1, wherein the vanes in the mixing position are bifurcated into at least two sections which are at different acute angles to the axis of the mixing passage.

8. A thermal mixer for reducing overall temperature of flue gas supplied to a fabric filter containing fabric having a maximum temperature tolerance, the flue gas supplied from at least two spray dry absorbers which are operable to cool flue gas passing therein, the mixer comprising:

a housing having a first inlet passage for flue gas from a first spray absorber, a second inlet passage for flue gas from a second spray dry absorber, an outlet passage for supplying flue gases from the first and second spray dry absorbers to a fabric filter, and a mixing passage between the inlet passages and the outlet passage, the mixing passage having an axis;

a plurality of spaced-apart parallel damper vanes Interconnected for movement in unison about their individual axes within the mixing passage, the vanes having flue gas mixing and non-mixing positions; and actuator means connected to the vanes to selectively direct the vanes into a flue gas mixing or non-mixing position.

9. A thermal mixer according to claim 8, wherein the vanes in the non-mixing position are parallel to the axis of the mixing passage.

10. A thermal mixer according to claim 8, wherein the vanes 120 in the mixing position are at an acute angle to the axis of the mixing passage.

11. A thermal mixer according to claim 8, wherein vanes are provided in at least two levels.

12. A thermal mixer according to claim 11, wherein in the mixing position, the vanes at one level are at a different acute angle to the axis of the mixing passage than the vanes at the other level.

13. A thermal mixer according to claim 8, wherein the axis of the mixing passage is inclined vertically.

14. A thermal mixer according to claim 8, wherein at least two sets of vanes are provided spaced from each other along the axis of the mixing passage.

* * * * *